US011055730B2

(12) United States Patent
Blomberg et al.

(10) Patent No.: US 11,055,730 B2
(45) Date of Patent: *Jul. 6, 2021

(54) OPTIMIZING PREDICTIVE PRECISION FOR ACTIONABLE FORECASTS OF REVENUE CHANGE

(71) Applicant: International Business Machines Corporation, Armonk, NY (US)

(72) Inventors: Jeanette L. Blomberg, Portola Valley, CA (US); Abhinav Maurya, Pittsburgh, PA (US); Aly Megahed, San Jose, CA (US); Hovey R. Strong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

This patent is subject to a terminal disclaimer.

(21) Appl. No.: 15/614,175

(22) Filed: Jun. 5, 2017

(65) Prior Publication Data

US 2018/0349930 A1 Dec. 6, 2018

(51) Int. Cl.
*G06Q 30/02* (2012.01)
*G06Q 10/04* (2012.01)
(Continued)

(52) U.S. Cl.
CPC ....... *G06Q 30/0202* (2013.01); *G06F 16/248* (2019.01); *G06N 5/003* (2013.01);
(Continued)

(58) Field of Classification Search
CPC ............... G06Q 30/0201; G06Q 10/04; G06Q 30/0202; G06Q 30/0204; G06Q 30/0282;
(Continued)

(56) References Cited

U.S. PATENT DOCUMENTS 7,092,894 B1 8/2006 Crone
7,222,293 B1 5/2007 Zapiec et al.
(Continued)

OTHER PUBLICATIONS

Alodah, Iman, and Jennifer Neville. "Combining gradient boosting machines with collective inference to predict continuous values." arXiv preprint arXiv:1607.00110 (2016). (Year: 2016).*
(Continued)

*Primary Examiner* — Charles Guiliano
*Assistant Examiner* — Thea Labogin
(74) *Attorney, Agent, or Firm* — Sherman IP LLP; Kenneth L. Sherman; Steven Laut

(57) ABSTRACT

One embodiment provides optimizing predictive precision for actionable forecasts of revenue change including receiving revenue data with timestamps for a number of historical periods at a particular level, with attributes of the particular level and a percentage of the required revenue change. The data is filtered. The filtered data is aggregated at the particular level for a selected prediction. A sliding window of the number of historical periods is moved over business periods, creating a data point for each historical period temporal window by extracting features. A required target output is created for each data point for at least one future time period. A model is trained to optimize predictive precision for actionable forecasts of revenue change. A set of recent histories is converted into a quantitative health value.

20 Claims, 13 Drawing Sheets

(51) Int. Cl.
*G06N 7/00* (2006.01)
*G06F 16/248* (2019.01)
*G06N 5/00* (2006.01)
*G06N 3/12* (2006.01)

(52) U.S. Cl.
CPC ............ *G06N 7/005* (2013.01); *G06Q 10/04* (2013.01); *G06N 3/126* (2013.01)

(58) Field of Classification Search
CPC ........... G06Q 30/0242; G06Q 30/0254; G06N 20/00; G06N 7/005; G06N 5/003; G06N 3/126; G06F 16/248
USPC ...................................................... 705/7.31
See application file for complete search history.

(56) References Cited

U.S. PATENT DOCUMENTS

| | | | |
|---|---|---|---|
| 7,379,890 B2 | 5/2008 | Myr et al. | |
| 7,654,445 B2 | 2/2010 | John et al. | |
| 7,716,092 B2 | 5/2010 | Schaub et al. | |
| 7,836,111 B1 | 11/2010 | Shan | |
| 7,870,047 B2 | 1/2011 | Mojsilovic et al. | |
| 8,195,499 B2 | 6/2012 | Angell et al. | |
| 8,412,572 B2 | 4/2013 | Cosman | |
| 8,645,200 B2* | 2/2014 | Fano | G06N 20/00 705/14.1 |
| 8,706,578 B2 | 4/2014 | Rieger | |
| 8,938,375 B2 | 1/2015 | Moll | |
| 9,165,270 B2 | 10/2015 | Dickinson et al. | |
| 9,183,525 B2 | 11/2015 | Blomberg et al. | |
| 9,411,650 B2 | 8/2016 | Magee et al. | |
| 2003/0212618 A1 | 11/2003 | Keyes et al. | |
| 2005/0289089 A1* | 12/2005 | Abe | G06N 20/00 706/12 |
| 2008/0172289 A1 | 7/2008 | Oh et al. | |
| 2010/0268661 A1* | 10/2010 | Levy | G06Q 30/02 705/347 |
| 2011/0138051 A1* | 6/2011 | Dawson | G06F 9/5072 709/226 |
| 2011/0161214 A1 | 6/2011 | Schaub et al. | |
| 2013/0254153 A1 | 9/2013 | Marcheret | |
| 2013/0325558 A1 | 12/2013 | Rosenberg | |
| 2014/0025434 A1 | 1/2014 | Bansal et al. | |
| 2014/0046733 A1 | 2/2014 | Grichnik | |
| 2014/0278754 A1* | 9/2014 | Cronin | G06Q 30/0201 705/7.29 |
| 2014/0279384 A1 | 9/2014 | Loevenich | |
| 2014/0324521 A1 | 10/2014 | Mun | |
| 2014/0365253 A1 | 12/2014 | Byers | |
| 2015/0100367 A1 | 4/2015 | Blomberg et al. | |
| 2015/0100369 A1* | 4/2015 | Blomberg | G06Q 10/06315 705/7.25 |
| 2015/0363890 A1 | 12/2015 | Butters et al. | |
| 2016/0260105 A1 | 9/2016 | Quilichini et al. | |
| 2016/0277317 A1 | 9/2016 | Buehrer | |
| 2018/0101771 A1* | 4/2018 | Schwarm | G06N 7/005 |

OTHER PUBLICATIONS

Shun, T., "The Use of Corporate Ledger Information in Payment Behavior Prediction—Evidence From The Finnish Construction Industry", Master's Thesis, Fall 2012, pp. 1-86, Finland.

Anonymous, "System and Method for Analytics Driven Sales Revenue Prediction", ip.com, Nov. 7, 2014, pp. 1-17, United States.

Mell, P., et al., "The NIST Definition of Cloud Computing", National Institute of Standards and Technology Special Publication 800-145, Sep. 2011, pp. 1-7, U.S. Department of Commerce, United States.

Friedman, J.H., "Greedy Function Approximation: A Gradient Boosting Machine," Annals of Statistics, 2001, pp. 1189-1232, Chicago, United States.

Morrison, J.A., "Change in Network Revenue Due to Changes in Capacities of Links", Journal of Mathematical Analysis and Applications, 2002, pp. 195-216, vol. 265, No. 1, Elsevier Science, Netherlands.

List of IBM Patents or Applications Treated as Related.

* cited by examiner

| 2014Q1 | 2014Q2 | 2014Q3 | 2014Q4 | 2015Q1 | 2015Q2 | 2015Q3 | 2015Q4 | 2016Q1 |
|---|---|---|---|---|---|---|---|---|
| 2014Q1 | 2014Q2 | 2014Q3 | 2014Q4 | 2015Q1 | 2015Q2 | 2015Q3 | 2015Q4 | 2016Q1 |
| 2014Q1 | 2014Q2 | 2014Q3 | 2014Q4 | 2015Q1 | 2015Q2 | 2015Q3 | 2015Q4 | 2016Q1 |
| 2014Q1 | 2014Q2 | 2014Q3 | 2014Q4 | 2015Q1 | 2015Q2 | 2015Q3 | 2015Q4 | 2016Q1 |
| 2014Q1 | 2014Q2 | 2014Q3 | 2014Q4 | 2015Q1 | 2015Q2 | 2015Q3 | 2015Q4 | 2016Q1 |

FIG. 7

OPTIMIZING PREDICTIVE PRECISION FOR ACTIONABLE FORECASTS OF REVENUE CHANGE

BACKGROUND

General ledgers of a business contain valuable, fine-grained information about historical incoming revenues from various customers. Understanding whether the incoming revenue from a customer will increase or decrease would be very useful in targeting customers who are likely to slow down or stop purchasing services. Knowing which offerings would lead to a boost in incoming revenues would help create new bundled offerings that can be sold to attract more customers.

SUMMARY

Embodiments relate to optimizing predictive precision for actionable forecasts of revenue change. One embodiment provides a method for receiving revenue data with timestamps for a number of historical periods at a particular level, with attributes of the particular level and a percentage of the required revenue change. The data is filtered. The filtered data is aggregated at the particular level for a selected prediction. A sliding window of the number of historical periods is moved over business periods, creating a data point for each historical period temporal window by extracting features. A required target output is created for each data point for at least one future time period. A model is trained to optimize predictive precision for actionable forecasts of revenue change. A set of recent histories is converted into a quantitative health value These and other features, aspects and advantages of the present invention will become understood with reference to the following description, appended claims and accompanying figures.

BRIEF DESCRIPTION OF THE DRAWINGS

FIG. 7 illustrates an example if a sliding window over data points, according to one embodiment;

DETAILED DESCRIPTION

Figure 1:
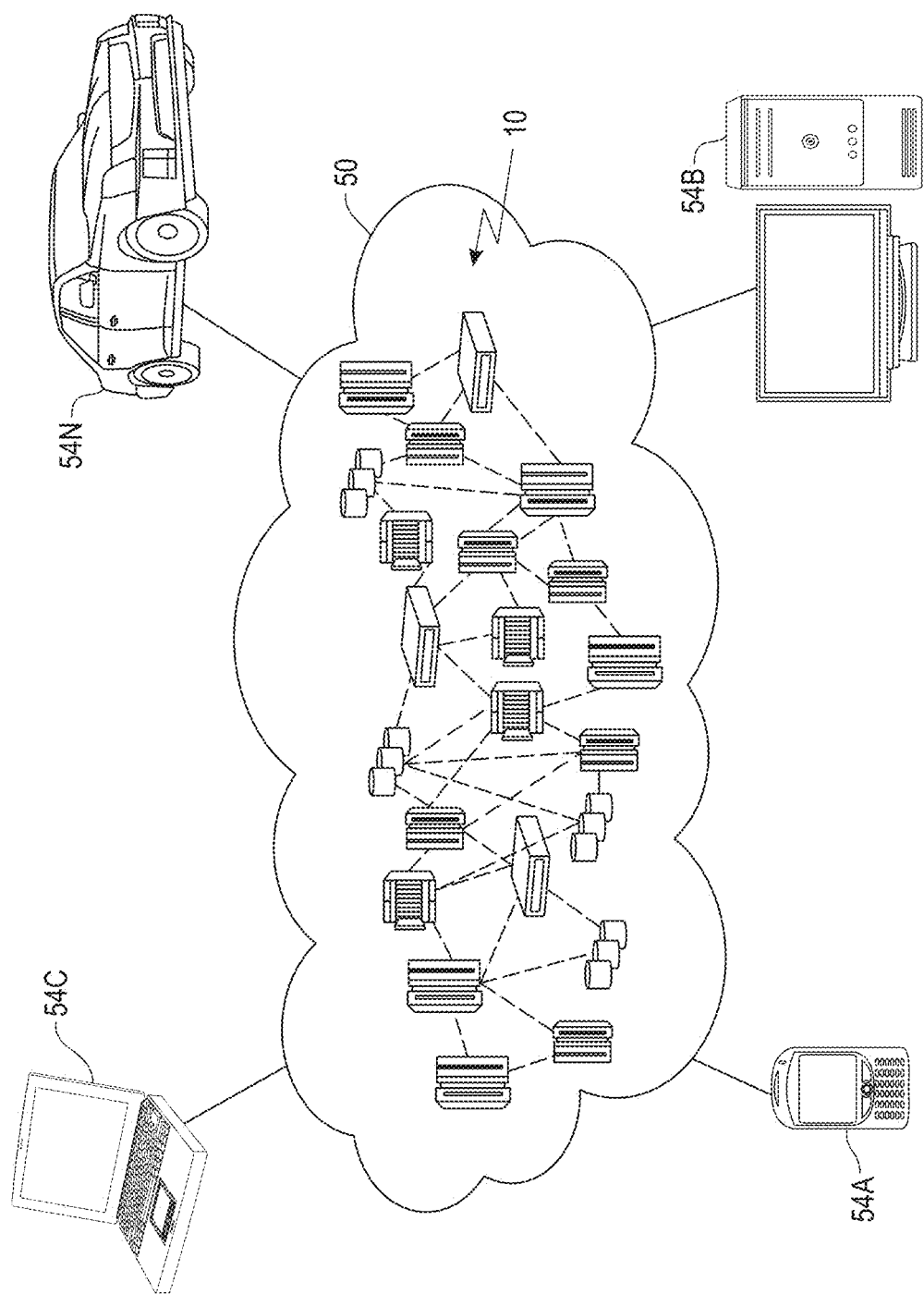
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for optimizing predictive precision for actionable forecasts of revenue change. In one embodiment, actionable information is provided to the sales organization of a vendor of services by transforming recent ledger behavior of clients into a prediction of future client behavior including abandoning the vendor. Such predictions are particularly valuable in the context of cloud services where the client need not pay a penalty for abandoning the vendor and the client is only billed for services rendered by the vendor on a short term basis. Conventional approaches to prediction of client behavior are (1) focused on long running contractual behavior with penalties for cancelling the contract, (2) involve significantly more complex prediction methods that are not immediately understandable by the sales personnel, or (3) are often significantly less precise in the cloud context. One embodiment provides for a prediction if the cloud business (any account, or client, any revenue) account revenue will increase or decrease by x %. More precisely, will the average revenue of future two quarters for any given account (or offering or account-offering pair) grow or shrink by x % compared to current quarter. In one example, revenues are aggregated over all offerings sold to that account in a given country. Revenue is recorded on a quarterly basis due to accounting practices is a noisy target to make predictions on. In one embodiment, a prediction for two future quarters is provided. In one embodiment, inputs may include metadata about the customer such as country of business, past revenues, etc. The output may include a probability (risk score) indicating if revenue will increase by x % in two future quarters.

One or more embodiments provide for predictive accuracy that treats each prediction loss equally. In predicting future revenue growth or shrinkage, all data points are not equally important. Risk of revenue losses from higher revenue clients are more important than lower revenue clients. One embodiment optimizes returning high revenue accounts at risk of shrinkage. One embodiment ranks accounts using monetary risk instead of just a probability risk.

Conventional prediction methods that optimize for accuracy would not perform well on real, imbalanced business datasets. Some business divisions that may see predominant growth have fewer data points whose target is 1 when predicting shrinkage by some percentage. Some business divisions that may see predominant shrinkage have fewer data points whose target is 1 when predicting growth by some percentage. In one embodiment, datasets specific to each business division are often imbalanced, and accuracy is therefore a poor metric to optimize for. Typically, sales resources are sufficient to take actions on saving only the top-k accounts predicted to shrink (top-k offerings predicted to grow). Thus, it is more important to have high quality predictions in the top-k with a minimum overall accuracy rather than lower-quality predictions in the top-k and higher overall accuracy. In one embodiment, obtaining the highest prediction precision (which corresponds to high quality leads) with a minimum recall (which corresponds to quantity) is provided. One embodiment uses machine learning classifiers that optimize for accuracy. Optimizing for precision and recall is computationally difficult since these are non-convex functions.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
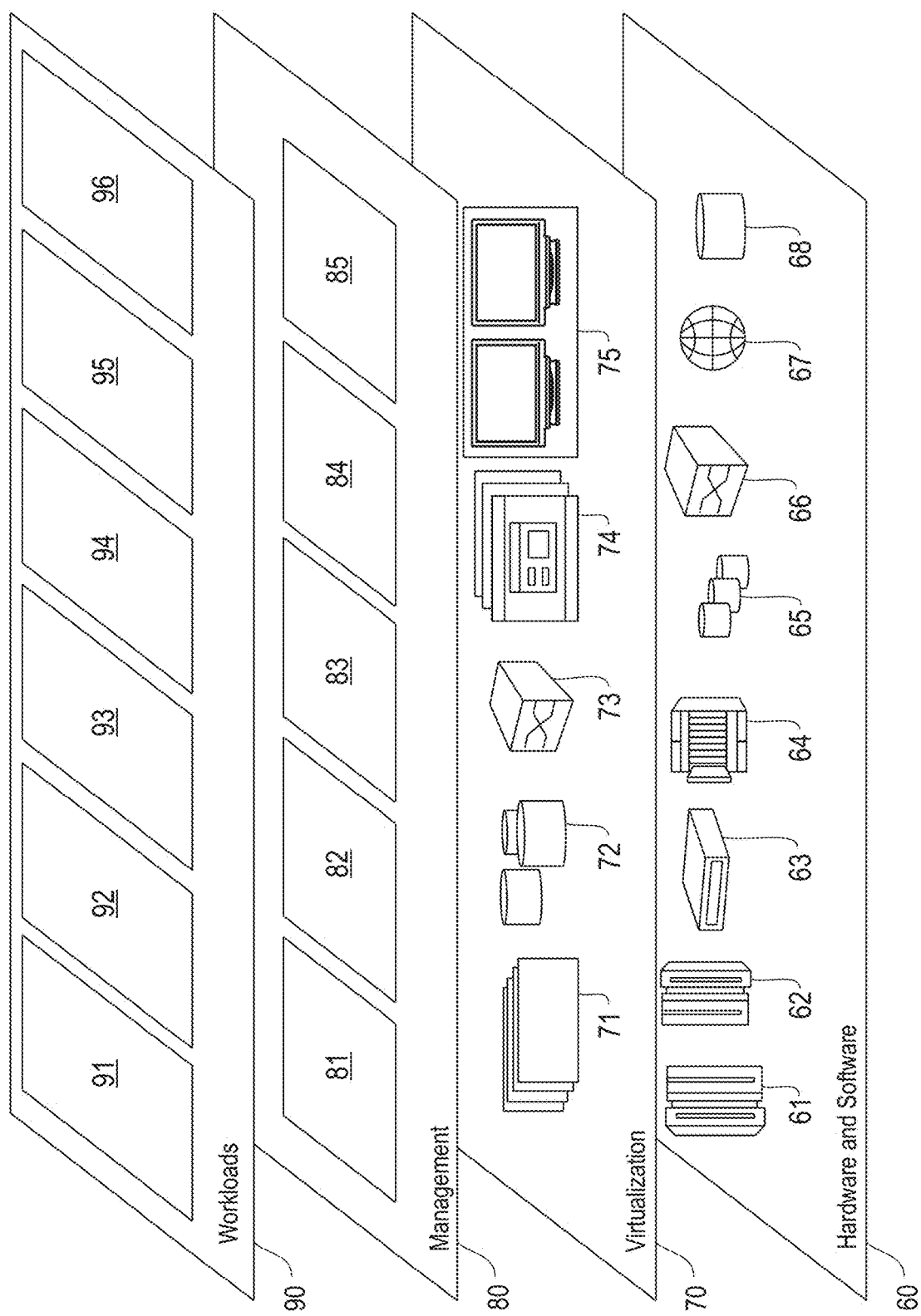
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimizing predictive precision for actionable forecasts of revenue change processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the function- ality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
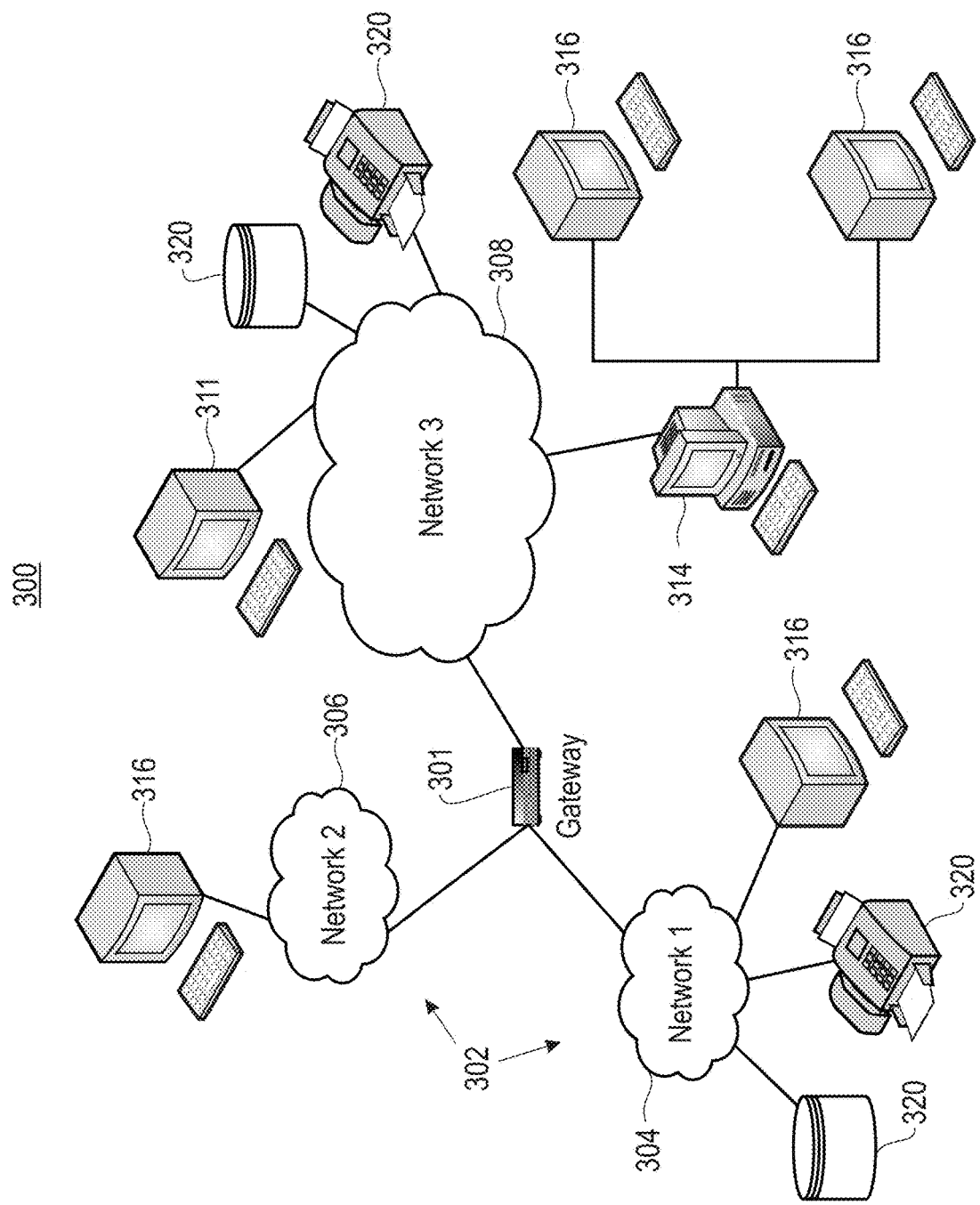
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
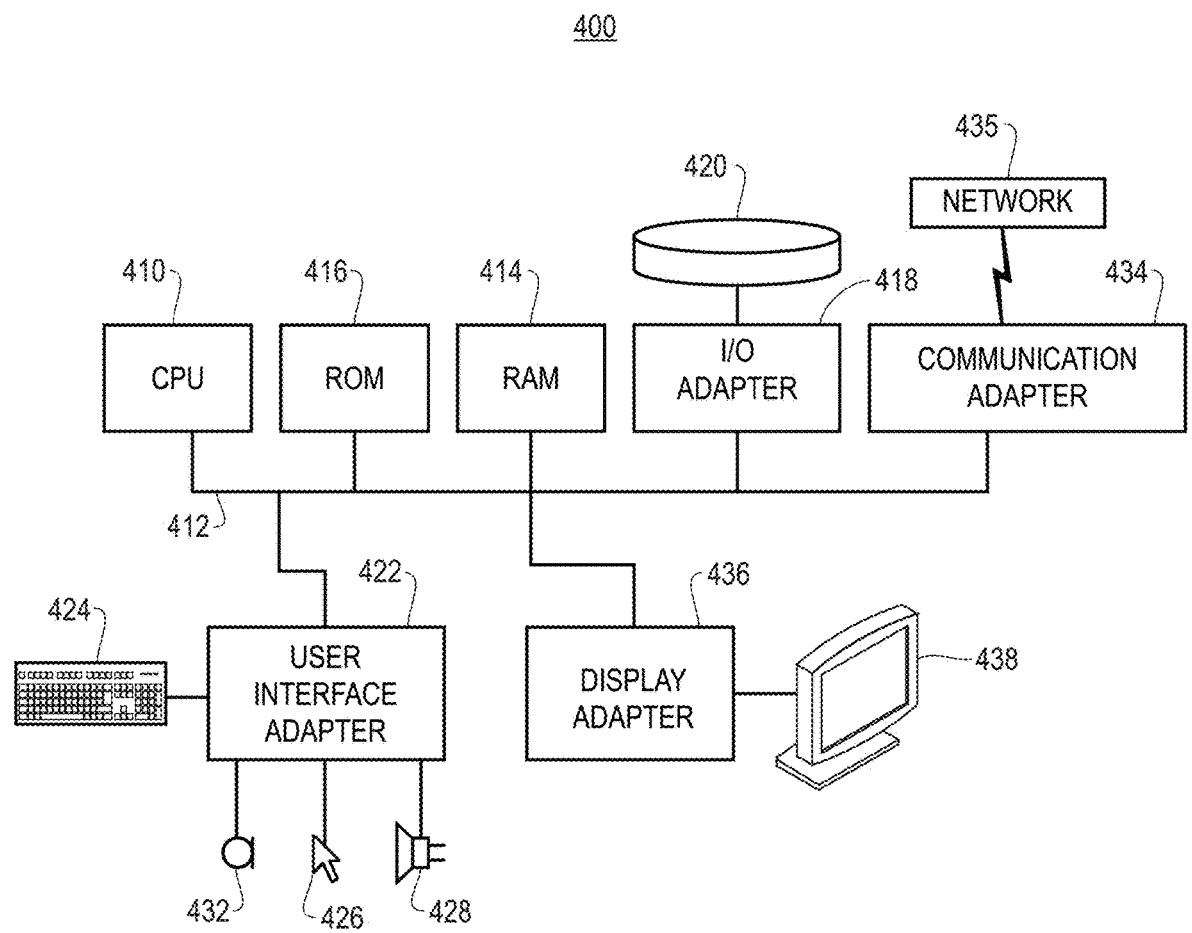
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
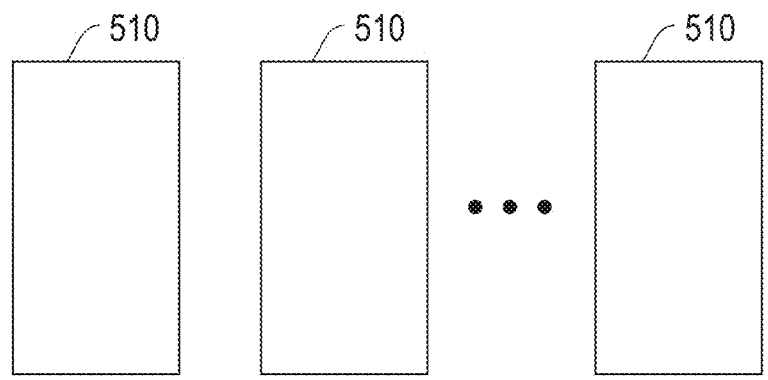
FIG. 5 is a block diagram illustrating a revenue change prediction system, according to one embodiment.
Figure 5:
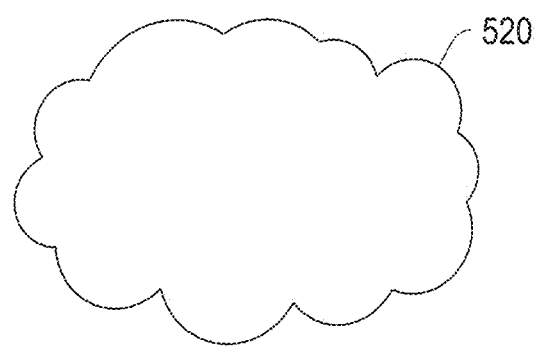
Figure 5:
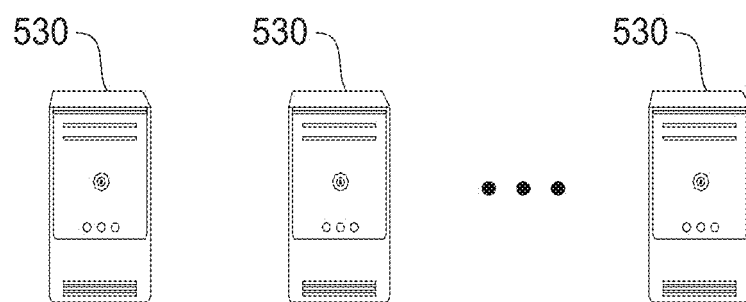

FIG. 5 is a block diagram illustrating a revenue change prediction system 500, according to one embodiment. In one embodiment, the revenue change prediction system 500 includes client devices 510 (e.g., mobile devices, smart devices, computing systems, etc.), a cloud or resource sharing environment 520, and servers 530. In one embodiment, the client devices are provided with cloud services from the servers 530 through the cloud or resource sharing environment 520.

Figure 6:
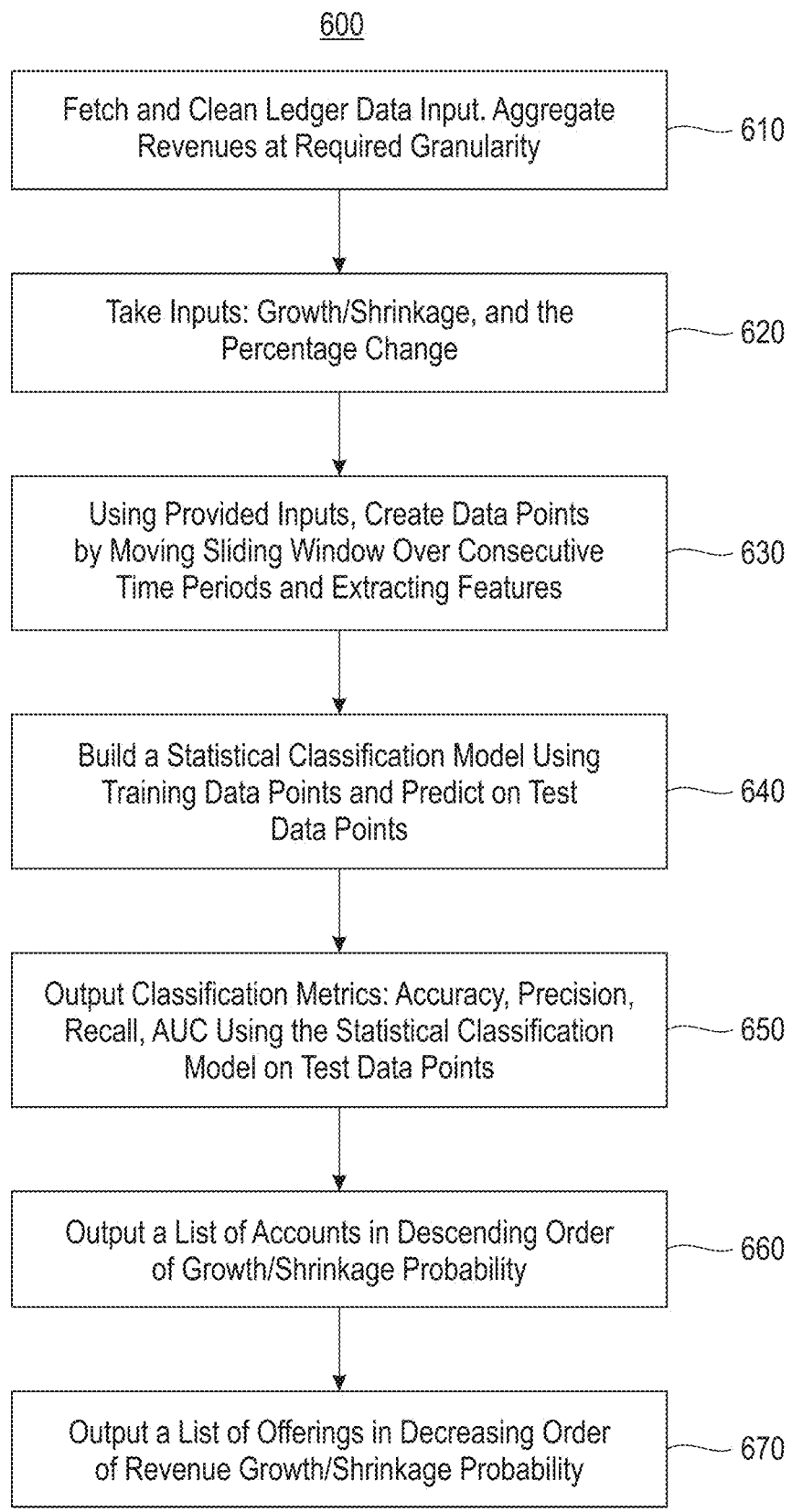
FIG. 6 illustrates a block diagram for a process for predicting ledger revenue change behavior of clients receiving services, according to one embodiment.

FIG. 6 illustrates a block diagram for a process 600 for predicting ledger revenue change behavior of clients receiving services, according to one embodiment. In one embodiment, the inputs to the process 600 may include: revenue for historical periods with timestamps (e.g., month, quarter, year, etc.) for each account-offerings pair and attributes (e.g., brand and geography, etc.); whether the required prediction is for growth or shrinkage of account/offering revenue; and percentage of growth or shrinkage. In one embodiment, the outputs may include: prediction (binary variable indicating the prediction by the machine learning algorithm of specified growth/shrinkage happening by specified percentage); probability (probability of specified growth/shrinkage happening by specified percentage); and ranked list of accounts/offerings in descending order of monetary gain/risk for growth/shrinkage.

In one embodiment, in block 610 ledger data input is obtained, and is cleaned/filtered for invalid values of brands/business divisions, revenue, etc., which are invariably present in a large database exported file. Revenue for a business-offering pair, for any periods where revenue is not mentioned, is assumed to be zero. In one embodiment, revenues are aggregated. For example, revenues are aggregated for each combination of customer identification (ID), offering ID, account year, account quarter, brand/business division, geographical location of business such as country name, etc. In one example, process 600 may be applied to any revenue change prediction at any granular level: accounts, offerings, or account-offerings pair (or any other granular level). Quarters are specific instantiations, but process 600 is not limited to quarters.

In one embodiment, in block 620, from the client device or user, process 600 obtains the following inputs: growth or shrinkage, and its percentage. In one embodiment, the following inputs may also be taken to filter data points on each of them: brand/business division, country, continent, etc. In block 630, for each combination of customer ID, offering ID, brand/business division, geographical location of business such as country name, continent, etc. In one embodiment, a sliding window is moved a number of time periods (e.g., five time periods) over the business periods (e.g., quarters). FIG. 7 illustrates an example if a sliding window (grey boxes) over data points, according to one embodiment. Returning back to FIG. 6, for each five temporal window periods (Q−2, Q−1, Q, Q+1, Q+2), a data point is created by extracting features (as indicated below). Each data point also has a target output used to predict given percentage of growth/shrinkage of revenues of future two time periods (Q+1, Q+2).

In one embodiment, the features may include the following ID: customer ID, offerings ID, or customer-offerings pair ID+year of current business quarter (e.g. 2014)+Quarter index of current business quarter (e.g. 1,2,3,4)+geography (e.g., Country ID where company is located)+Brand/Business Division Name. Q: revenue for current business quarter Q. Q−1: revenue for business quarter Q−1; Q−2: revenue for business quarter Q−2; BACKWARD RATIO: Q−2/(Q−1+Q); FORWARD RATIO: Q/(Q−1+Q−2); LOG(BACKWARD RATIO): log of BACKWARD_RATIO; LOG(FORWARD RATIO): log of FORWARD_RATIO; SIGN (BACKWARD RATIO): sign of BACKWARD_RATIO; SIGN(FORWARD RATIO): sign of FORWARD_RATIO; and NUMBER OF POSITIVE QUARTERS: number of positive revenue quarters out of Q, Q−1, and Q−2. The GROWTH(XX)/SHRINKAGE(XX) is the target indicator variable indicating if average revenue of two future quarters grew/shrunk by XX percent.

In one embodiment, in block 640 training of a statistical classification model (e.g., using boosted classification trees) is performed. In one example, one hundred trees are used in each learned gradient boosted classifier.

In one embodiment, in blocks 650-670, outputs are obtained as follows. In one embodiment, the binary predictions and the prediction probability for each data point in a test dataset is obtained using the statistical classification model learned in block 640. Prediction and prediction probabilities are used to output goodness of classification metrics such as accuracy, precision, recall, area under the ROC (Receiver Operating Characteristic) curve. Offerings in a test dataset are sorted in decreasing order of growth probability and presented to a user as actionable (ie, for further action). Customers in the test dataset are sorted in decreasing order of shrinkage probability and presented to user for further action. In block 650, classification metrics (accuracy, precision, recall, and AUC (Area under ROC curve) are output using the statistical classification model on test data points. In block 660, a list of accounts in descending order of Growth/Shrinkage probability is output. In block 670, a list of offerings in decreasing order of revenue Growth/Shrinkage probability is output. One or more embodiments aim at helping the cloud business predict shrinking and abandoned accounts so that it can save the revenue coming from shrinking or abandoning. This is in the range of millions each quarter. One or more embodiments aim at predicting offerings that are expected to grow. This is very useful for business as it can upsell/cross-sell such offerings and the predictions can be also used in business sales planning.

Figure 8:
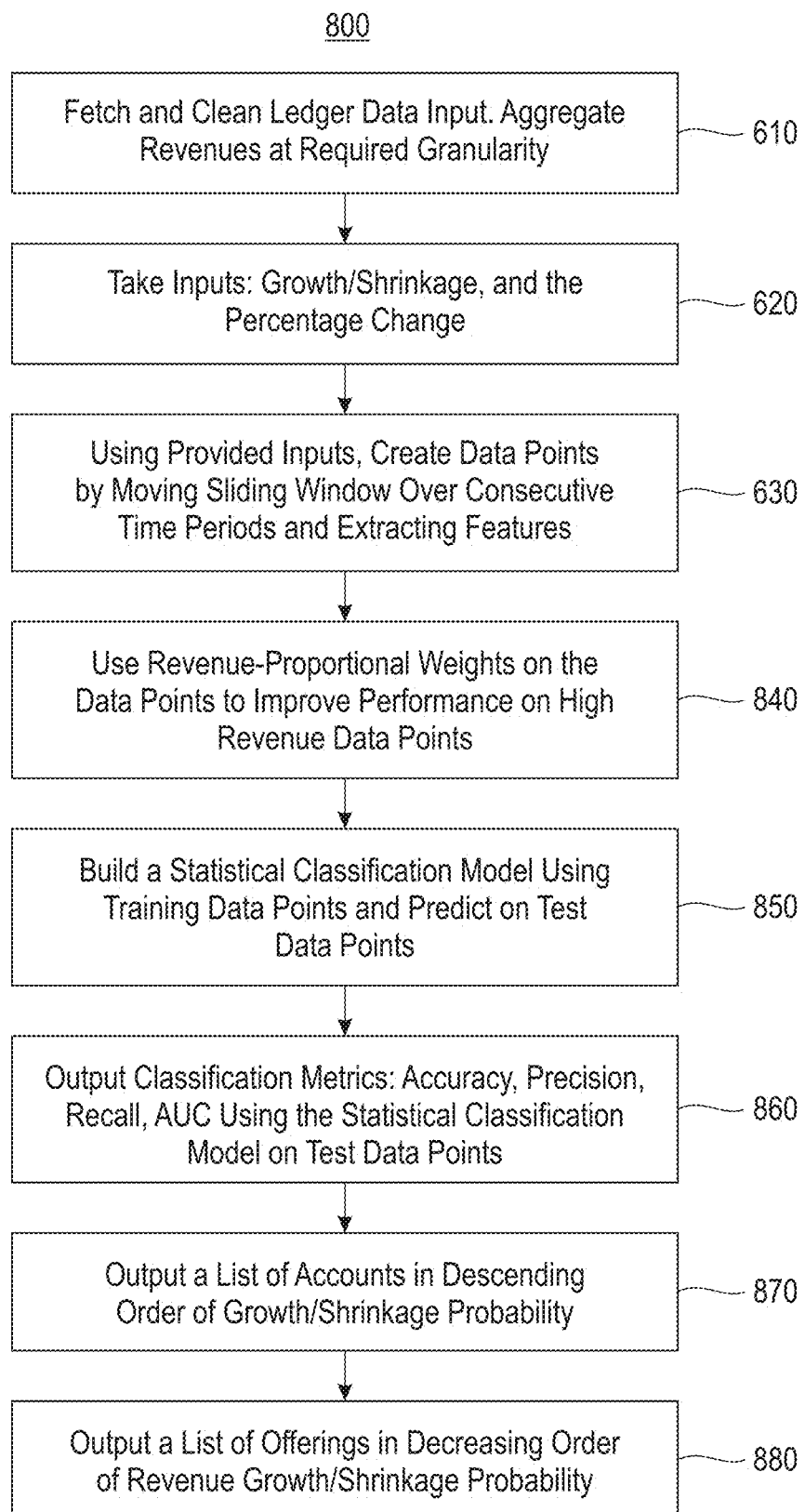
FIG. 8 illustrates a block diagram for a process for optimizing revenue savings for actionable forecasts of revenue change, according to one embodiment.

FIG. 8 illustrates a block diagram for a process 800 for optimizing revenue savings for actionable forecasts of revenue change, according to one embodiment. In one embodiment, the inputs for process 800 include: revenue for some historical periods with timestamps (e.g., month, quarter, year, etc.) for each account-offerings pair and attributes (e.g., brand and geography, etc.); whether the required prediction is for growth or shrinkage of account/offering revenue; and percentage of growth or shrinkage. The outputs for process 800 may include: prediction (binary variable indicating the prediction by the machine learning algorithm of specified Growth/Shrinkage happening by specified percentage); probability (probability of specified Growth/Shrinkage happening by specified percentage); and ranked list of accounts/offerings in descending order of monetary gain/risk for growth/shrinkage.

The terminology used herein includes the following.
TP=True Positives
FP=False Positives
TN=True Negatives
FN=False Negatives
N=Total number of data points Classification Evaluation Metrics $$\text{Accuracy} = \frac{TP + TN}{TP + TN + FP + FN} = \frac{TP + TN}{N}$$

$$\text{Precision} = \frac{TP}{TP + FP}$$

$$\text{Recall} = \frac{TP}{TP + FN}$$

$AUC$(Area under $ROC$ curve)

In one embodiment, for process 800 blocks 610-630 are the same as described above in process 600. Block 840 provides for optimizing for revenue savings instead of predictive accuracy. In one embodiment, a weighted dataset is built or generated such that each data point is weighted by a value proportional to the company's revenue. Better to use a slowly growing function like log of revenue to avoid extreme values of revenue dominating the entire loss function being optimized. Hence, the data point weights $w_i$ are logarithmic value of absolute value of the total revenue over past three quarters i.e. Q, Q–1, Q–2. A value of two (2) is added to each weight to prevent negative or zero weights, particularly to prevent a weight of negative infinity at zero revenues.

In one embodiment, in block 850 process 800 trains a statistical classification model (e.g., a boosted classification trees, etc.). Most machine learning classifiers optimize for unweighted loss function.

$$\max(TP + TN) = \max(N - FP - FN)$$
$$= \min(FP + FN)$$
$$= \min \sum_i \text{loss}(datapoint_i)$$

The loss function that is optimized is a weighted linear combination of the losses over each data point.

$$\min \sum_i w_i * \text{loss}(datapoint_i)$$

This ensures that losses over higher revenue data points are given more importance in the minimization since weights are monotonically increasing in revenue magnitude. Additionally, the loss function provides higher revenue savings since the customers detected to have shrinking future revenues are also likely to be high-paying customers.

In one embodiment, blocks 860-880, outputs are obtained as follows. In one embodiment, the binary predictions and the prediction probability for each data point in a test dataset are obtained using the statistical classification model learned in block 850. Prediction and prediction probabilities are used to output goodness of classification metrics such as accuracy, precision, recall, area under the ROC (Receiver Operating Characteristic) curve. Offerings in a test dataset are sorted in decreasing order of growth probability and presented to a client of a user for further actionability. In block 860, classification metrics (accuracy, precision, recall, and AUC are output using the statistical classification model on test data points. In block 870, a list of accounts in descending order of Growth/Shrinkage probability is output. In block 880, a list of offerings in decreasing order of revenue Growth/Shrinkage probability is output. In one embodiment, the customers/offerings/customer-offerings pairs are ranked by the probability of shrinkage by x %. In another embodiment, the customers are ranked by monetary risk as follows: Monetary risk=Probability of shrinkage by x %*Revenue lost due to x % shrinkage. A metric provides a complete picture of the risk associated with an account. The metric is expected to provide higher revenue savings since the customers predicted to have shrinking future revenues are also likely to be high-paying customers. A difference from just using monetary risk is that process 800 weighs data points by their corresponding revenues in learning the model to get more confident prediction of shrinkage probabilities before calculating monetary risk. Conventional methods put an equal weight on each data point during the learning phase of the classifier. Process 800 gives a significantly higher potential revenue saving since it puts shrinking accounts with "highest" revenue on top (gives a higher monetary risk to save in terms of accounts and a higher one to gain in terms of offerings).

Figure 9:
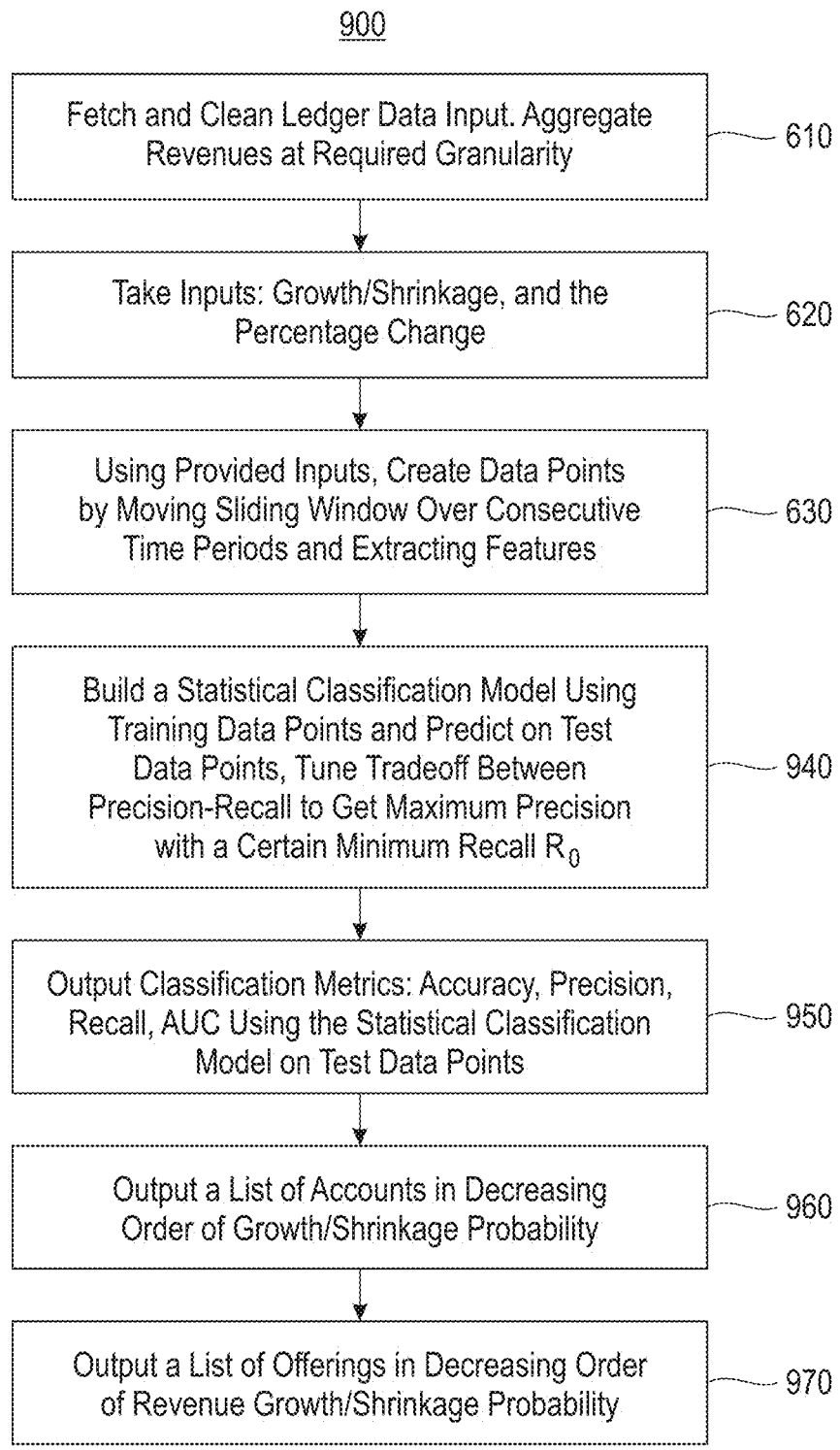
FIG. 9 illustrates a block diagram for a process for optimizing predictive precision for actionable forecasts of revenue change, according to one embodiment.

FIG. 9 illustrates a block diagram for a process 900 for optimizing predictive precision for actionable forecasts of revenue change, according to one embodiment. In one embodiment, The inputs for process 900 include: revenue for some historical periods with timestamps (e.g., month, quarter, year, etc.) for each account-offerings pair and attributes (e.g., brand and geography, etc.); whether the required prediction is for growth or shrinkage of account/offering revenue; percentage of growth or shrinkage; and recall threshold or percentile for calculating recall threshold. In one embodiment, the outputs for process 900 include: prediction (binary variable indicating the prediction by the machine learning algorithm of specified Growth/Shrinkage happening by specified percentage); probability (probability of specified Growth/Shrinkage happening by specified percentage; and ranked list of accounts/offerings in descending order of probability of growth/shrinkage. These outputs are at maximum precision and at least the given/calculated minimum recall $R_0$.

In one embodiment, blocks 610-630 are the same as described above. In one embodiment, in block 940 optimization is performed for predictive precision instead of predictive accuracy. Most machine learning classifiers optimize for accuracy.

$$\max(TP+TN)=\max(N-FP-FN)=\min(FP+FN)=\min \Sigma_i \text{loss}(datapoint_i)$$

In one embodiment, process 900 optimizes a modified parametrized objective function such that parameter balances tradeoff between precision and accuracy $$\min\{w \cdot FP + (1-w) \cdot FN\}$$

w is a parameter between (0,1)

Using one amongst various meta-optimization techniques such as grid search, line search, Bayesian optimization (based on Gaussian processes), simulated annealing, genetic algorithms, etc., process 900 determines the parameter w such that a parametrized algorithm returns the highest precision with a specified minimum recall $R_0$. In one embodiment, a statistical classification model (e.g., a boosted classification trees) is trained. Process 900 searches over the parameter w that trades off between precision and recall to obtain a statistical model that provides maximum precision for a certain minimum recall. In one embodiment, In one embodiment, in process 900 a Gaussian process based Bayesian optimization provides better results than a uniform grid search. Gaussian processes are good for exploration versus exploitation tradeoff in optimization. Process 900 focuses on areas of parameter space that have higher chances of attaining maximum objective value. In other embodiment, the framework is not limited to Gaussian processes as any general or unidimensional optimization algorithm such as grid search, line search, genetic algorithms, simulated annealing gradient ascent, etc. may be used. The minimum recall $R_0$ can be specified in one of several ways: user-specified, inferred as a suitable percentile (e.g. top $20^{th}$ percentile, etc.) from the histogram of recall values obtained from the precision-recall curve of a baseline tree boosting classifier that optimizes vanilla accuracy, as a fraction of the precision (e.g., recall must be at least $1\over 14^{th}$ of the precision), etc.

Figure 10:
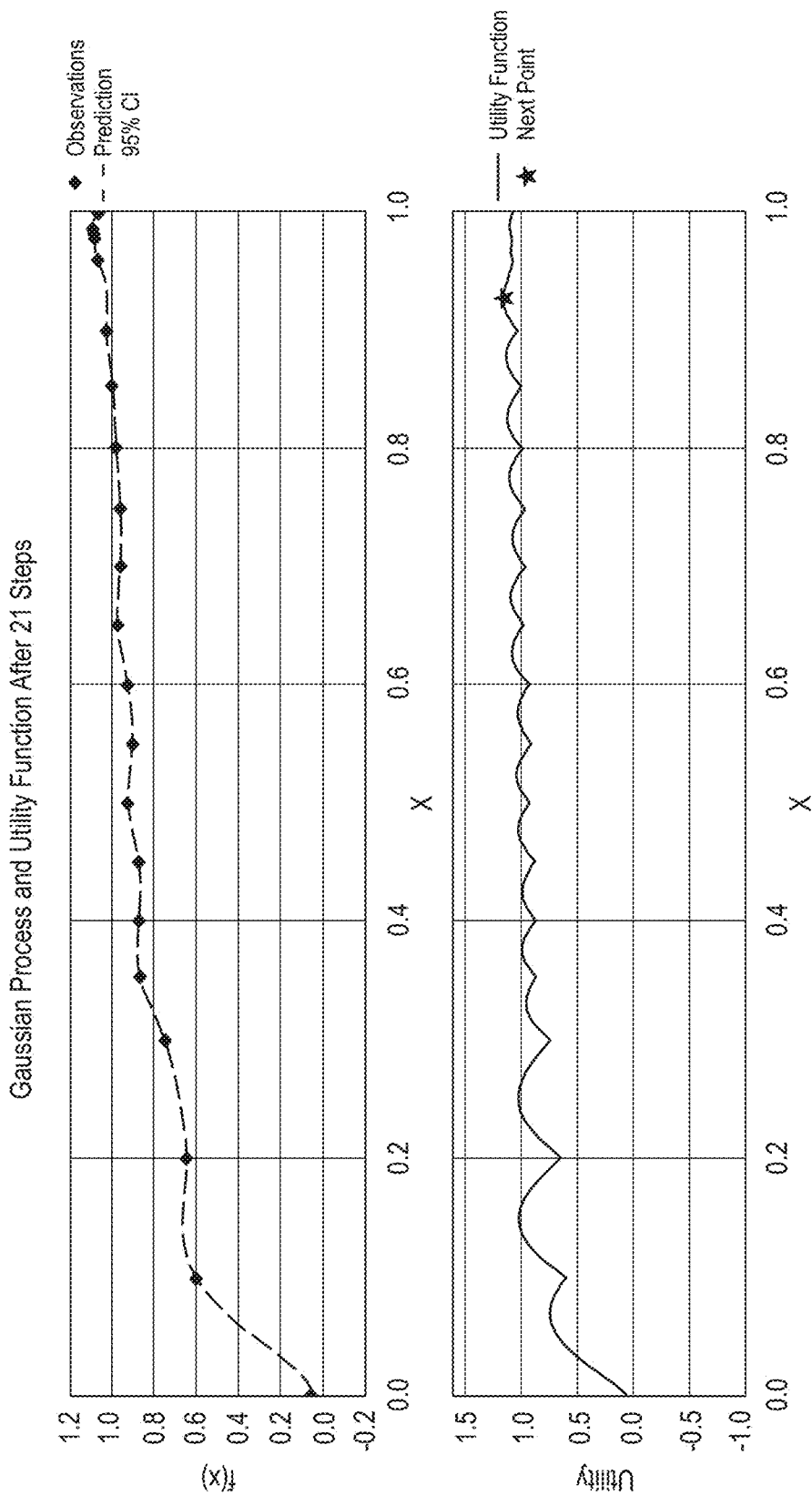
FIG. 10 illustrates example graphs showing regularized precision being optimized using a Gaussian process, according to one embodiment.
Figure 11:
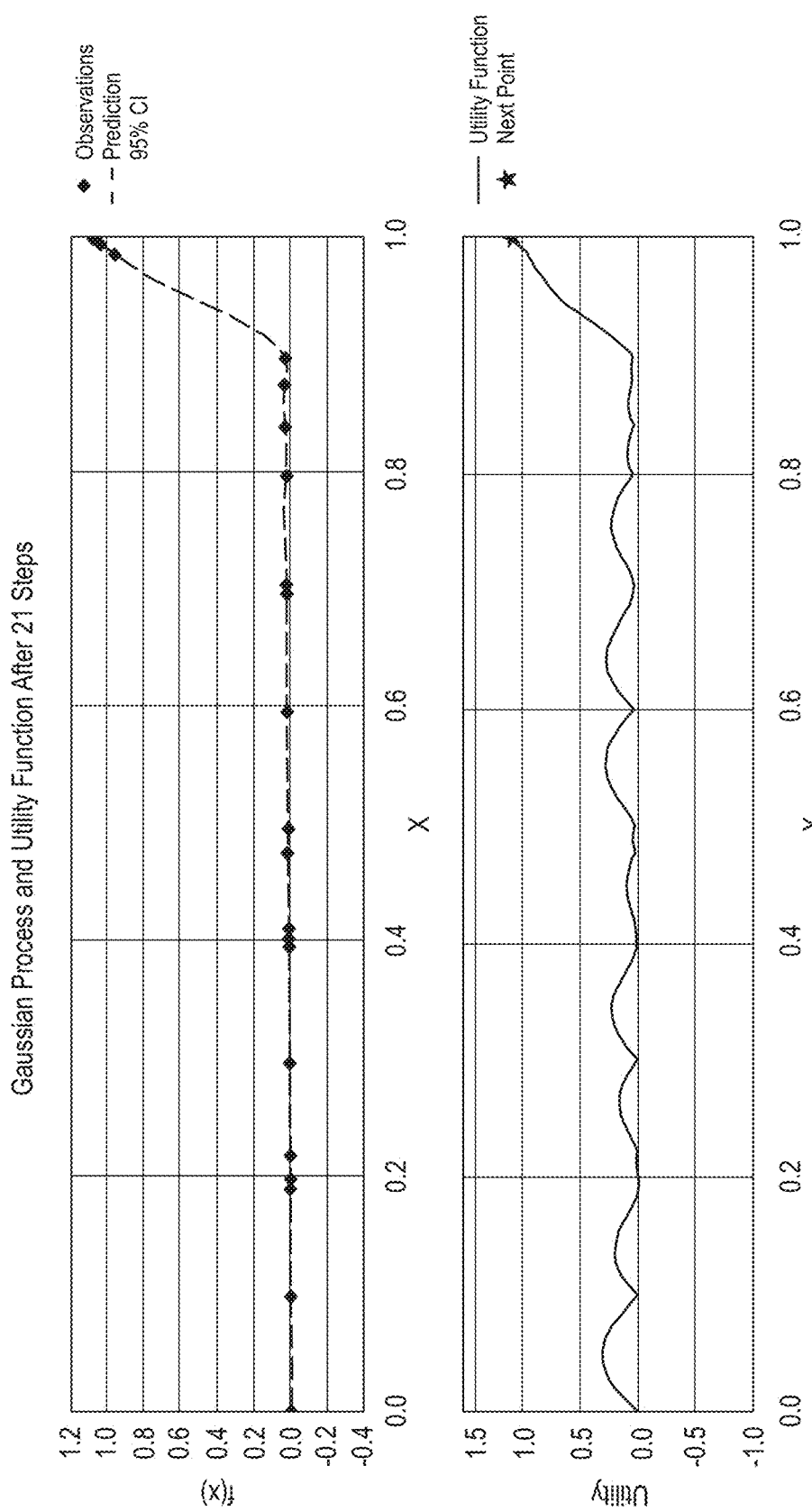
FIG. 11 illustrates a set of example graphs showing Bayesian optimization over weight w that correctly explores the space and identifies a value of w to yield precision close to 1, according to one embodiment.
Figure 12:
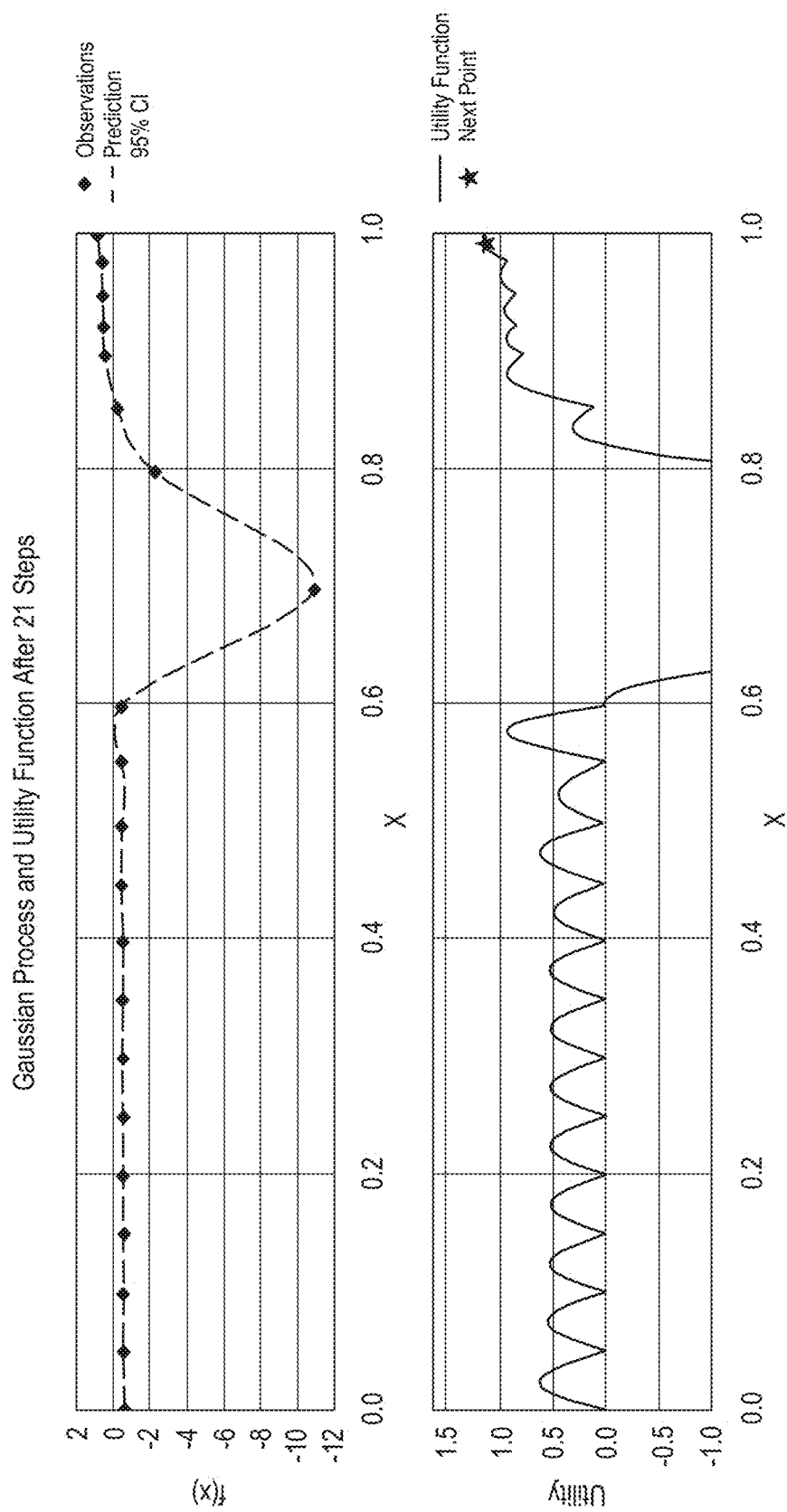
FIG. 12 illustrates another set of example graphs showing Bayesian optimization over weight w that correctly explores the space and identifies a value of w to yield precision close to 1, according to one embodiment.
Figure 13:
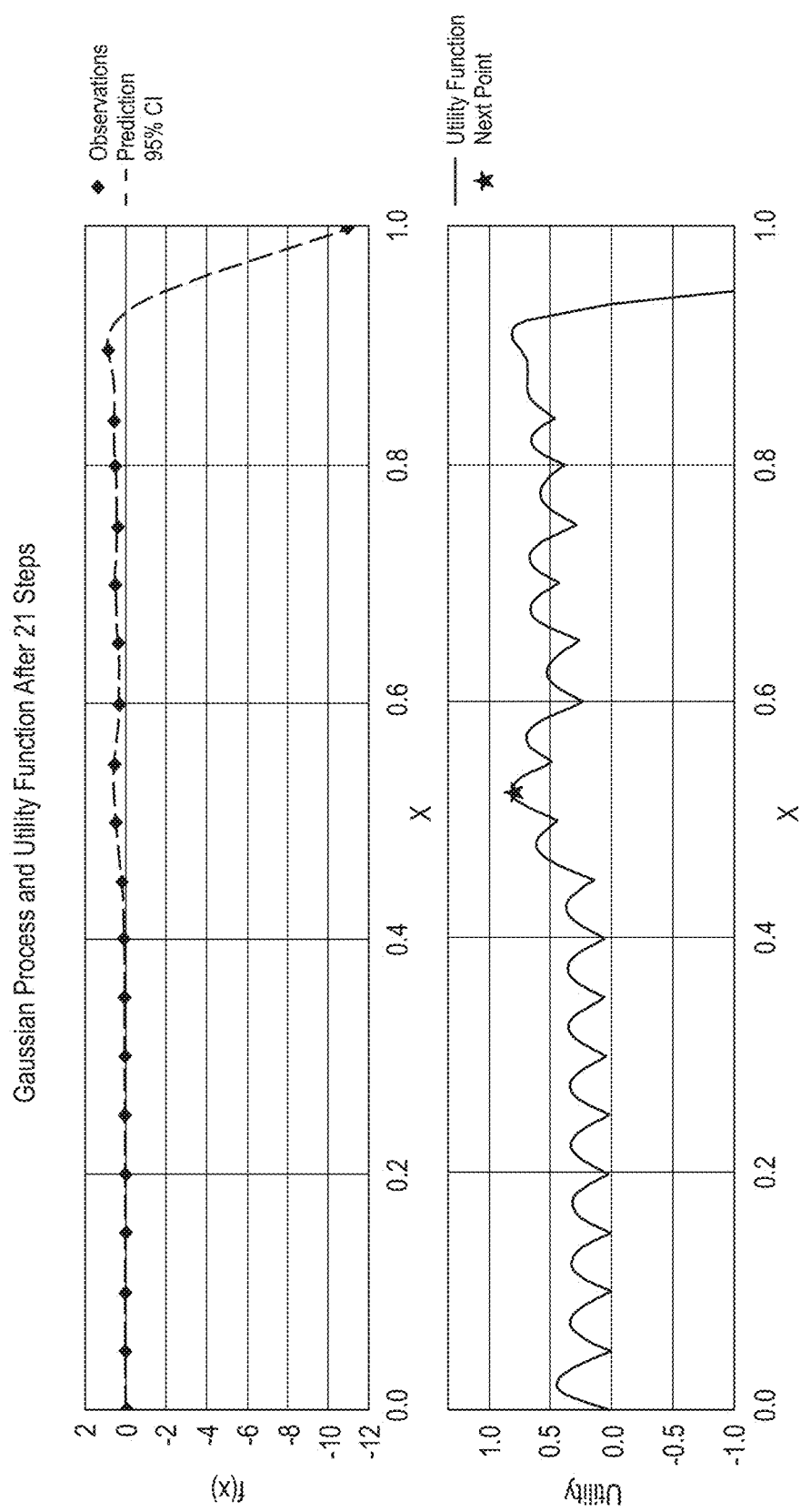
FIG. 13 illustrates yet another set of example graphs showing Bayesian optimization over weight w that correctly explores the space and identifies a value of w to yield precision close to 1, according to one embodiment.

In one embodiment, FIG. 10 illustrates example graphs showing regularized precision being optimized using a Gaussian process, according to one embodiment. FIG. 11 illustrates a set of example graphs showing Bayesian optimization over weight w that correctly explores the space and identifies a value of w to yield precision close to 1, according to one embodiment. FIG. 12 illustrates another set of example graphs showing Bayesian optimization over weight w that correctly explores the space and identifies a value of w to yield precision close to 1, according to one embodiment. FIG. 13 illustrates yet another set of example graphs showing Bayesian optimization over weight w that correctly explores the space and identifies a value of w to yield precision close to 1, according to one embodiment.

Returning to FIG. 9, in one embodiment, in blocks 950-970, outputs are obtained as follows. In one embodiment, the binary predictions and the prediction probability for each data point in a test dataset is obtained using the statistical classification model learned in block 940. Prediction and prediction probabilities are used to output goodness of classification metrics such as accuracy, precision, recall, area under the ROC curve. Customers in the test dataset are sorted in decreasing order of monetary risk and presented to user for further actionability, where monetary risk=probability of shrinkage by x %*Revenue lost due to x % shrinkage. Offerings in test file are sorted in decreasing order of growth probability and presented to user for further actionability. In block 950, classification metrics (accuracy, precision, recall, and AUC) are output using the statistical classification model on test data points. In block 960, a list of accounts in descending order of Growth/Shrinkage probability is output. In block 970, a list of offerings in decreasing order of revenue Growth/Shrinkage probability is output. In one embodiment, process 900 provides a significantly higher potential revenue saving since it puts shrinking accounts with "highest" chances of being shrunk or abandoned on top and thus acting on those would yield a higher probability of revenue savings.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for machine learned optimizing predictive precision for actionable forecasts of predicted future data changes applicable to computing services for a plurality of accounts comprising:

receiving, by a processor device, data with timestamps for a number of historical periods at a particular level, with attributes of the particular level and a percentage of a required data change;

filtering, by the processing device, the data by removing invalid values for the attributes for creating filtered data;

aggregating, by the processing device, the filtered data at the particular level for a selected future prediction for generating aggregated data;

creating a data point, from the aggregated data, for each historical period temporal window by extracting features based on moving a sliding window of the number of historical periods over business periods;

creating, by the processing device, a required target output for each data point for at least one future time period;

training, by the processing device, a statistical classification model by using machine learning processing that includes training a plurality of boosted classification trees used for learned gradient boosted classifiers for optimization processing based on a weighted loss function over each data point that provides a weighted linear combination of losses where each loss of the weighted linear combination of losses is separately weighted for each data point applicable to computing services for the plurality of accounts to optimize for predictive precision for actionable forecasts of predicted future changes applicable to computing services for the plurality of accounts, wherein the learned gradient boosted classifiers perform searches over a parameter that trades off between precision and recall to obtain the trained statistical classification model that provides a maximum precision for a particular minimum recall based on focusing on areas of a parameter space, including the parameter, that have higher chances of attaining maximum objective value; and for each of the data points: determining, by the processing device, learned outputs, from the trained statistical classification model, that include prediction and probability of predicted future changes applicable to computing services for the plurality of accounts for predicted shrinking and abandoned accounts for the plurality of accounts.

2. The method of claim 1, wherein the required data change comprises one of a growth and a shrinkage at a particular percentage, and the parameter space includes parameters having higher probability for attaining a maximum objective value.

3. The method of claim 1, wherein the selected future prediction comprises one of a prediction that a vendor will be abandoned within a next one or more periods unless action is taken by the vendor.

4. The method of claim 1, wherein the required data change comprises a prediction at one of: an accounts or customer level, an offerings level, and an accounts-offerings level.

5. The method of claim 1, wherein aggregating the filtered data at the particular level for the selected future prediction is performed at the required data change, at a required percentage, and at a required level.

6. The method of claim 1, wherein training the statistical classification model comprises-using a selected optimization technique that is selected from a plurality of optimization techniques, the trained statistical classification model modifies the parameter of a modified parameterized objective function, such that the parameter balances tradeoff between precision and accuracy, and the modified parameterized objective function is based on the learned gradient boosted classifiers predictions of false positives and false negatives.

7. The method of claim 6, wherein the selected optimization technique comprises selecting from a group comprising: a grid search meta-optimization technique, a line search meta-optimization technique, Bayesian optimization based on Gaussian processes, simulated annealing, and a genetic algorithm.

8. The method of claim 6, wherein the particular minimum recall is based on the learned gradient boosted classifiers predictions of true positives and false negatives.

9. The method of claim 8, wherein the particular minimum recall is one of: user-specified, inferred as a predetermined percentile from a histogram of recall values obtained from a precision-recall curve of a baseline classifier that optimizes accuracy, and specified as a fraction of precision.

10. The method of claim 7, wherein one learned output comprises one of: a ranked list in descending order of the prediction probability at the required level and provided to an electronic device, and a ranked list in descending order of the prediction probability at the required level multiplied by a corresponding revenue loss and provided to an electronic device.

11. The method of claim 1, wherein the weighted loss function provides that losses over higher data points are provided more weight in minimization.

12. A computer program product for machine learned optimizing predictive precision for actionable forecasts of future data changes applicable to computing services for a plurality of accounts, the computer program product comprising a computer readable storage medium having program instructions embodied therewith, the program instructions executable by a processor to cause the processor to:

receive, by the processor, data with timestamps for a number of historical periods at a particular level, with attributes of the particular level and a percentage of a required data change;

filter, by the processor, the data by removing invalid values for the attributes for creating filtered data;

aggregate, by the processor, the filtered data at the particular level for a selected future prediction for generating aggregated data;

create, by the processor, a data point, from the aggregated data, for each historical period temporal window by extracting features based on moving-a sliding window of the number of historical periods over business periods;

create, by the processor, a required target output for each data point for at least one future time period;

train, by the processor, a statistical classification model by using machine learning processing that includes training a plurality of boosted classification trees for learned gradient boosted classifiers for optimization processing using on a weighted loss function over each data point that provides a weighted linear combination of losses where each loss of the weighted linear combination of losses is separately weighted for each data point applicable to computing services for the plurality of accounts to optimize for predictive precision for actionable forecasts of predicted future changes applicable to computing services for the plurality of accounts, wherein the learned gradient boosted classifiers perform searches over a parameter that trades off between precision and recall to obtain the trained statistical classification model that provides a maximum precision for a particular minimum recall based on focusing on areas of a parameter space, including the parameter, that have higher chances of attaining maximum objective value; and for each of the data points: determining learned outputs, from the trained statistical classification model, that include prediction and probability of future changes applicable to computing services for the plurality of accounts for predicted shrinking and abandoned accounts for the plurality of accounts.

13. The computer program product of claim 12, wherein:
the required data change comprises one of: a growth, a shrinkage at a particular percentage; and
the parameter space includes parameters having higher probability for attaining a maximum objective value.

14. The computer program product of claim 12, wherein the required data change comprises a prediction at one of: an accounts or customer level, an offerings level, and an accounts-offerings level.

15. The computer program product of claim 12, wherein:
the selected future prediction comprises one of a prediction that a vendor will be abandoned within a next one or more periods unless action is taken by the vendor; and
aggregating the filtered data at the particular level for the selected future prediction is performed at the required data change, at a required percentage, and at a required level.

16. The computer program product of claim 15, wherein:
one learned output comprises one of: a ranked list in descending order of the prediction probability at the required level and provided to an electronic device, and a ranked list in descending order of the prediction probability at the required level multiplied by a corresponding revenue loss and provided to the electronic device.

17. The computer program product of claim 15, wherein:
training the statistical classification model comprises using a selected optimization technique that is selected from a plurality of optimization techniques, the trained statistical classification model modifies the parameter of a modified parameterized objective function, such that the parameter balances tradeoff between precision and accuracy, and the modified parameterized objective function is based on the learned gradient boosted classifiers predictions of false positives and false negatives;

the selected optimization technique comprises selecting from a group comprising: a grid search meta-optimization technique, a line search meta-optimization technique, Bayesian optimization based on Gaussian processes, simulated annealing, and a genetic algorithm;

the particular minimum recall is one of: user-specified, inferred as a predetermined percentile from a histogram of recall values obtained from a precision-recall curve of a baseline classifier that optimizes accuracy, and specified as a fraction of precision; and the weighted loss function provides that losses over higher data points are provided more weight in minimization.

18. An apparatus comprising:

a memory configured to store instructions; and a server including a processor configured to execute the instructions to:

receive data with timestamps for a number of historical periods at a particular level, with attributes of the particular level and a percentage of a required data change;

filter, by the processor, the data by removing invalid values for the attributes for creating filtered data;

aggregate, by the processor, the filtered data at the particular level for a selected future prediction for generating aggregated data;

create, by the processor, a data point, from the aggregated data, for each historical period temporal window by extracting features based on moving a sliding window of the number of historical periods over business periods;

create, by the processor, a required target output for each data point for at least one future time period;

train, by the processor, a statistical classification model by using machine learning processing that includes training a plurality of boosted classification trees for learned gradient boosted classifiers for optimization processing based on a weighted loss function over each data point that provides a weighted linear combination of losses where each loss of the weighted linear combination of losses is separately weighted for each data point applicable to computing services for the plurality of accounts to optimize for predictive precision for actionable forecasts of future changes applicable to computing services for the plurality of accounts, wherein the learned gradient boosted classifiers perform searches over a parameter that trades off between precision and recall to obtain the trained statistical classification model that provides a maximum precision for a particular minimum recall based on focusing on areas of a parameter space, including the parameter, that have higher chances of attaining maximum objective value; and for each of the data points: determine, by the processor, learned outputs from the trained statistical classification model, that include prediction and probability of future changes applicable to computing services for the plurality of accounts for predicted shrinking and abandoned accounts for the plurality of accounts.

19. The apparatus of claim 18, wherein:

the required data change comprises one of: a growth, a shrinkage at a particular percentage;

a prediction at one of: an accounts or customer level, an offerings level, and an accounts-offerings level;

the selected future prediction comprises one of a prediction that a vendor will be abandoned within a next one or more periods unless action is taken by the vendor;

aggregating the filtered data at the particular level for the selected future prediction is performed at the required data change, at a required percentage, and at a required level;

one learned output comprises one of: a ranked list in descending order of the prediction probability at the required level and provided to an electronic device, and a ranked list in descending order of the prediction probability at the required level multiplied by a corresponding revenue loss and provided to the electronic device; and the parameter space includes parameters having higher probability for attaining a maximum objective value.

20. The apparatus of claim 18, wherein:

training the statistical classification model comprises using a selected optimization technique that is selected from a plurality of optimization techniques, the trained statistical classification model modifies the parameter of a modified parameterized objective function, such that the parameter balances tradeoff between precision and accuracy, and the modified parameterized objective function is based on the learned gradient boosted classifiers predictions of false positives and false negatives;

the selected optimization technique comprises selecting from a group comprising: a grid search meta-optimization technique, a line search meta-optimization technique, Bayesian optimization based on Gaussian processes, simulated annealing, and a genetic algorithm;

the particular minimum recall is based on the learned gradient boosted classifiers predictions of true positives and false negatives;

the particular minimum recall is one of: user-specified, inferred as a predetermined percentile from a histogram of recall values obtained from a precision-recall curve of a baseline classifier that optimizes accuracy, and specified as a fraction of precision; and the weighted loss function provides that losses over higher data points are provided more weight in minimization.

* * * * *